Feb. 22, 1966  J. T. BERNSTEIN  3,236,059
SEPARATION OF GASEOUS MIXTURES
Filed Aug. 29, 1962  2 Sheets-Sheet 1

INVENTOR.
JOSEPH T. BERNSTEIN
BY Shanley & O'Neil
ATTORNEYS.

Feb. 22, 1966  J. T. BERNSTEIN  3,236,059
SEPARATION OF GASEOUS MIXTURES

Filed Aug. 29, 1962  2 Sheets-Sheet 2

INVENTOR.
JOSEPH T. BERNSTEIN
BY Shanley & O'Neil
ATTORNEYS.

United States Patent Office 3,236,059
Patented Feb. 22, 1966

3,236,059
SEPARATION OF GASEOUS MIXTURES
Joseph T. Bernstein, Westport, Conn., assignor to Air Products and Chemicals, Inc., a corporation of Delaware
Filed Aug. 29, 1962, Ser. No. 220,316
4 Claims. (Cl. 62—13)

The present invention relates to the separation of gaseous mixtures, and more particularly to improvements in methods and apparatus for separating gaseous mixtures by liquefaction and fractionation.

In the separation of gaseous mixtures into component gases in a fractionating operation, a compressed gaseous mixture is cooled by heat exchange with relatively cold components that have been separated from the gaseous mixture, and is fed to a fractionating operation having one or more fractionating zones in which the gaseous mixture is separated into component fluids. For example, in the fractionation of atmospheric air, a high boiling component which is essentially oxygen and a low boiling component which is essentially nitrogen are produced as the component gases, and these may be in either liquid or vapor phase.

Although the present invention will be herein disclosed and described and illustrated in the environment of the separation of air, it is to be expressly understood that the principles of this invention may be employed in connection with the separation of other gaseous mixtures by liquefaction and fractionation to produce various desired component fluids. The term "component fluid" as employed in the following description and claims jointly and severally defines the different boiling point fractions of a gaseous mixture, such as the oxygen and nitrogen fractions of air, and moreover refers to the fractions of a gaseous mixture obtained during fractionation and not only to the pure elemental components.

The gaseous mixture to be separated enters a fractionating operation relatively warm and the separated components leave the operation relatively cold. As the production of the required refrigeration is at the expense of work, it is essential to economical operation that the cold of the components be recovered. This is ordinarily done by passing the gaseous mixture and the separate components in countercurrent heat exchange relation with each other, either simultaneously, as by the employment of recuperators, or alternately, as by the employment of accumulators. In either event, heat passes from the entering mixture to the product, so that in the absence of heat leak, the change of enthalpy of the streams in each direction is theoretically equal and of opposite sign. In effect, the heat loss of the entering mixture is in theory equal to the heat gain of the exiting product.

The enthalpy of the gas mixture varies directly as the product of its specific heat and temperature. The specific heat, in turn, varies directly with pressure and inversely with temperature. Therefore, it is obvious that if streams of the same specific heat are passed in countercurrent heat exchange relationship with each other, the temperature difference between the streams at all points will be equal. Thus, if, for example, air at a certain pressure is passed in countercurrent heat exchange with its separated products at the same pressure and at only moderately different temperatures, the temperature differential between the streams will be about constant over the region of heat exchange, for the specific heat of air is the same as the proportionate mean specific heat of its components.

But this holds true only at the same pressure. And in fact, equal pressures are not usually encountered in gas separation cycles in which a major source of refrigeration is the expansion of a compressed gaseous feed mixture. In particular, it is often required that one or more of the products of the separation be at high pressure. Two different types of cycle have been proposed in the past for providing component gas in vapor phase under high pressure and at ambient temperature. In one type of cycle, which may be referred to as a "gas cycle," component gas is withdrawn from the fractionating zone in vapor phase, warmed to ambient temperature upon passing in heat exchange relation with gaseous mixture on its way to the fractionating zone, and is then compressed to the relatively high pressure desired by means of a compressor such as a centrifugal compressor. In the other type of cycle, which may be called a "pump cycle" component gases are withdrawn from the fractionating zone in liquid phase, pumped while in liquid phase to the desired relatively high pressure, and then passed in heat exchange relation with the gaseous mixture on its way to the fractionating zone to vaporize and warm the high pressure component gas to ambient temperature. Gas cycles have the advantage that the power requirements are low inasmuch as atmospheric air fed to the cycle need only be compressed to a relatively low superatmospheric pressure and inasmuch as it is possible to remove high boiling impurities from the atmospheric air feed, such as carbon dioxide and water, by the use of gas compressors operating at ambient temperature. This requirement increases the power consumption and presents expensive maintenance problems, and also often presents an explosion hazard. Furthermore, in a gas cycle, it is not possible to apply large quantities of external refrigeration. Moreover, due to the difference at low temperatures in the specific heat of atmospheric air under the required pressure and specific heat of the component fluids under the relatively low pressure of the fractionating zone, additional means must be provided to "unbalance" the switching heat exchange zones so as to insure removal of deposited high boiling point impurities, such as carbon dioxide, to permit substantially continuous operation of the cycle.

On the other hand, in a pump cycle, a component fluid may be delivered in gaseous phase at a desired relatively high pressure and gaseous pumping equipment is not required, because the component to be delivered at high pressure may be pumped in liquid phase with the well-known advantages of that procedure. Such liquid phase pumping enables the high pressure fluid to be delivered uncontaminated with high boiling point impurities such as hydrocarbon lubricants, for the pumped fluid itself can serve as the lubricant. Also, it is possible to apply large quantities of external refrigeration to a pump cycle.

But in a pump cycle, at least one of the component fluids is heat exchanged against the entering mixture at the high pressure to which that component fluid has been pumped in liquid phase, for the high pressure component fluid must of course be pumped in liquid phase before it can be vaporized by heat exchange against entering gaseous mixture. And as was noted above, the specific heat of a fluid increases with pressure, so that the specific heat of the pumped liquid will be higher than that of the entering gaseous mixture against which it is heat exchanged. Thus, although the temperatures of the component may approach the temperature of the mixture quite closely at the relatively cold end of the zone of heat exchange between components and entering gaseous mixture, it is impossible in a single heat exchanger to bring the temperatures at the warm end of the heat exchange zone close to each other. As is well known, this condition reflects an inefficiency resulting in loss of refrigeration values.

To remedy this thermodynamic unbalance, an arrangement known as a "dual-presure cycle" has been proposed, in which a portion of the feed mixture is compressed to a very high pressure so as to raise the specific heat of a sufficient portion of the feed mixture to balance the rise in specific heat of the high presure component fluid that results from pumping in liquid phase. In such dual-pressure cycles, all the entering gaseous mixture may be compressed to a relatively low pressure and a portion exchanged against a relatively low presure component fluid from the fractionating operation, and then a further portion of the compressed gaseous mixture may be further compressed to a relatively high pressure and heat exchanged against the relatively high pressure liquid phase component fluid and also perhaps against a portion of a low pressure component fluid from the fractionating zone. The high pressure feed portion is then expanded to the pressure of the low pressure feed portion and the two feed portions are recombined and fed to the fractionating operation. For example, in an air separation operation, the low pressure feed may be heat exchanged against waste nitrogen and the high pressure feed against high pressure liquid oxygen, and perhaps also against a portion of waste nitrogen, after which the cooled high pressure air is expanded to the pressure of the cooled low pressure air and the air feed is introduced into a high pressure fractionating zone of a fractionating column including a plurality of fractionating zones, for example, two zones. In speaking of a fractionating column in this specification and the appended claims, it is to be understood that the term "column" includes one or more fractionating zones such as fractionating stages, and that in the case of plural fractionating zones, the zones need not be stacked one atop the other but can be bodily separate from each other provided they are in fluid communication with each other and preferably also in heat exchange relation with each other for the performance of a continuous fractionating operation.

Such cycles that provides a balance of heat exchange between the entering gaseous mixtures and the exiting separated components thus require that the mixture be compressed to two different pressures, and in the case of one prior art proposal, to three different pressures. It is then necessary to expand the higher pressure feed stream, and the compression and expansion of the higher pressure feed stream before and after heat exchange with the higher pressure component stream introduces a power loss into the system. This power loss is more than compensated, of course, by the recovery of refrigeration that characterizes a dual-pressure cycle. Nevertheless, the power loss, which can be considered a refrigeration loss, that attaches to the compression and expansion of the higher pressure feed stream represents a substantial and continuing factor of expense in the operation of a fractionation system.

Accordingly, the object of the present invention is to provide methods and apparatus for the separation of gaseous mixtures, for example, air, in which the inefficiency inherent in the supply of gaseous mixture at different pressures is reduced and a portion of the power or refrigeration loss inherent in the provision of feed at different pressures is recovered.

Other objects and advantages of the present invention will become apparent from a consideration of the following description, taken in connection with the accompanying drawings, in which.

Figure 1:
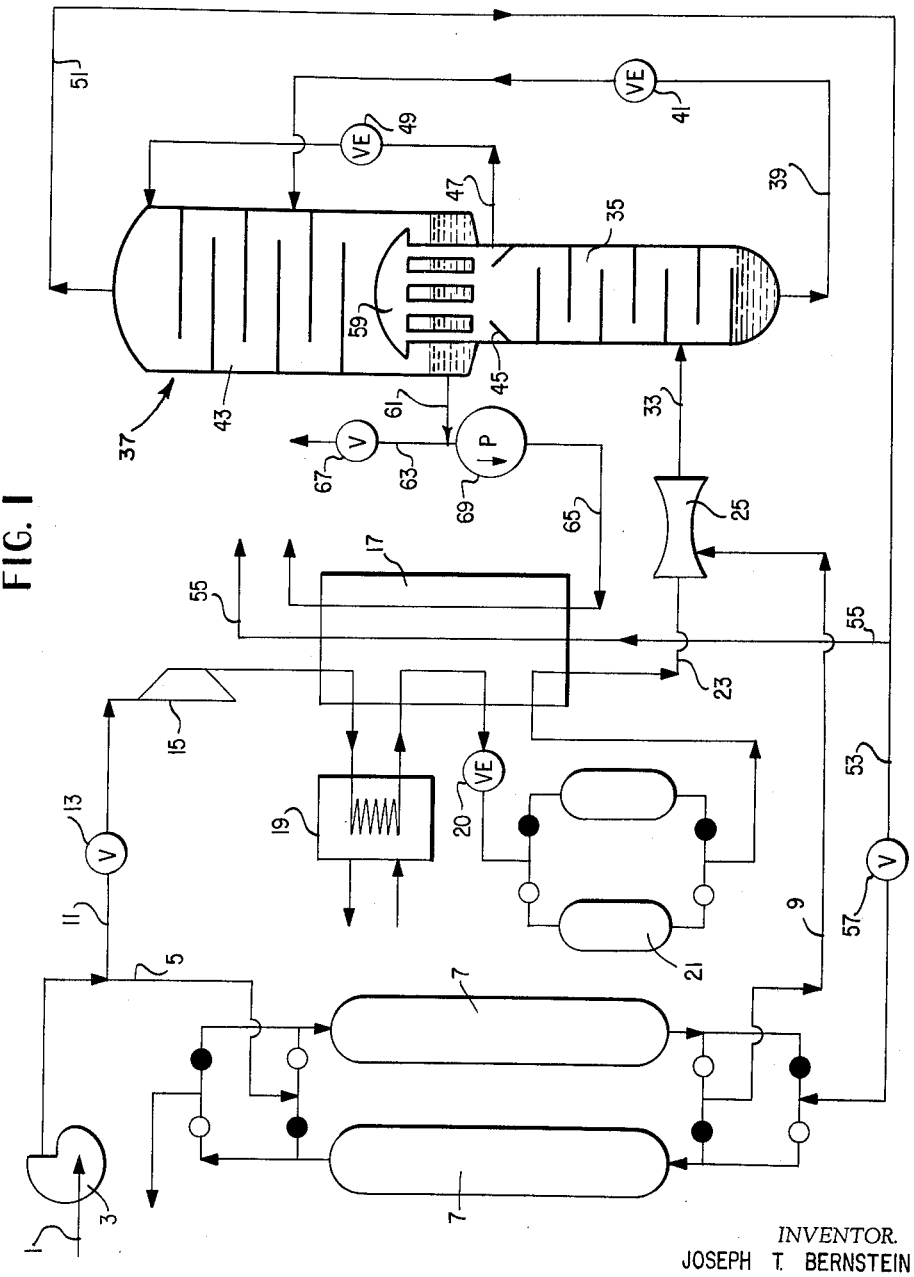
FIGURE 1 is a diagrammatic view of a separation cycle for gaseous mixtures according to the present invention.

Broadly stated, the present invention comprises the discovery that the efficiency of a gas separation operation can be improved in those instances in which there is a relatively low pressure feed portion and a relatively high pressure fed portion, if the high pressure feed portion is expanded only to a pressure intermediate the high and low pressures of the feed portions and at least a portion of the energy of that expansion is utilized to raise the pressure of the low pressure feed portion to a pressure intermediate those high and low pressures. Preferably, the intermediate pressure to which the high presure stream is expanded and the intermediate pressure to which the low pressure stream is raised are the same. In this latter connection, it is also preferred that the intermediate pressure streams be merged prior to feeding them to the fractionating operation. It is preferred that all of the feed be compressed to a relatively low pressure and that the high pressure portion of the feed then be produced by further compressing a portion of the total feed that has been compressed to relatively low pressure. The preferred gaseous mixture is air, of which the fluid components include oxygen and nitrogen. The preferred means for expanding the high pressure feed to an intermediate pressure and for using expansion energy of the high pressure feed to raise the low pressure feed to intermediate pressure is an ejector or injector having a high pressure inlet and a low pressure inlet and an intermediate pressure outlet for merged high and low pressure streams. Preferably, the pressure of the low pressure feed stream is below the pressure of the fractionating zone to which the intermediate pressure fed is introduced. The fractionating operation in connection with air is preferably characterized by two fractionating zones, with the intermediate pressure feed being supplied to the higher pressure zone and the component fluids for heat exchange with the feed being withdrawn from the lower pressure zone.

Referring now to the drawings in greater detail, and describing the cycle for purposes of illustration in connection with the separation of air into oxygen and nitrogen, the air at atmospheric temperature and pressure enters the cycle through conduit 1 and passes to main compressor 3 in which all of the air is raised to 77.1 p.s.i.a. and 100° F. The feed air is then split and 56.6% of it sent through conduit 5 through one of a conventional pair of reversing heat exchangers 7 and thence through conduit 9. The material in conduit 9 has been cooled in the on-stream exchanger 7 to a temperature of −276° F.

The remaining 43.4% of the feed is diverted through conduit 11, and a valve 13, which may be in either of conduits 5 and 11, controls the proportion of the feed that goes through each of conduits 5 and 11. The air in conduit 11, which has already been compressed to 77.1 p.s.i.a. in compressor 3, is then further compressed in booster compressor 15 to 2500 p.s.i.a. It leaves compressor 15 and the aftercooler thereof (not shown) at 40° F. and enters heat exchanger 17, in which it is cooled against exiting separated component fluid. Auxiliary refrigeration is provided during the passage of the high pressure gas through exchanger 17, and to this end the feed is withdrawn from an intermediate point along exchanger 17 and cooled in a conventional Freon cooler 19 over the temperature range from −35° F. to −75° F. and is then returned to exchanger 17 at the appropriate temperature level therein. The feed is again withdrawn from exchanger 17 at −175° F. and expanded to 800 p.s.i.a. and −205° F. in an expansion valve 20. The feed is then cleaned of its carbon dioxide and hydrocarbon in one of a conventional pair of switching adsorbers 21, after which the feed is returned to exchanger 17 to complete its passage therethrough. The cooled high pressure feed leaves exchanger 17 through conduit 23 at a temperature of −235° F. and a pressure of 800 p.s.i.a.

Figure 2:
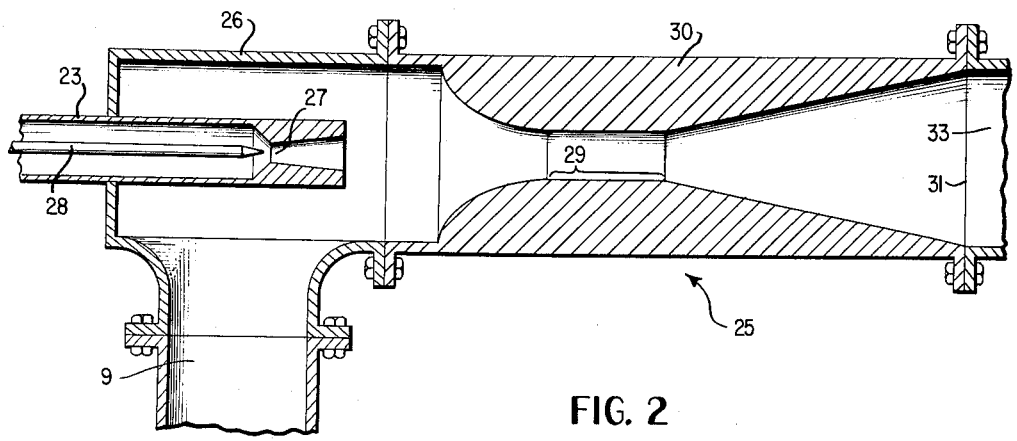
FIGURE 2 is a cross-sectional view of an injector used in the invention.

The material in conduit 23 is thus the high pressure stream of the feed and the material in conduit 9 is thus the low pressure stream of the feed. Both of these streams then enter an ejector or injector 25. As shown in FIGURE 2, injector 25 is characterized by a removable inlet section 26 which comprises a relatively small inlet for high pressure gas from conduit 23 and a relatively large inlet for low pressure gas from conduit 9. The inlet for high pressure gas is restricted by a relatively small high pressure inlet throat 27 which has a longitudinally adjustable needle valve member 28 movable coaxially of the high pressure inlet section by a valve actuator (not shown) to adjust the effective orifice characteristics of inlet throat 27.

Downstream from inlet throat 27 is a lower pressure downstream throat 29 in the form of a cylindrical side wall portion that terminates at either end in smoothly rounded internal surfaces of a removable section 30 of which throat 29 has the least internal diameter. Section 30 terminates downstream in an intermediate pressure outlet 31.

Thus, conduit 23 communicates with the high pressure inlet and conduit 9 with the low pressure inlet of injector 25, while the merged high an low pressure streams at an intermediate pressure of 84.5 p.s.i.a. and −280° F. leave injector 25 through conduit 33 and are 27.5% in liquid phase. Although as noted, injector 25 may be of conventional construction, it might also be noted that for a total air feed of a million standard cubic feet per hour, injector 25 might have representative dimensions of 0.438 inch diameter for throat 27, which flares downstream over a distance of 4.125 inches to an internal diameter of 0.875 inch, this larger diameter of high pressure inlet opening being spaced from the upstream end of throat 29 a distance of 13 inches, throat 29 being 8.375 inches long and 2.87 inches in diameter, and the distance from the downstream end of throat 29 to the downstream end of the injector, that is, to outlet 31, being about 34 inches. FIGURE 2, of course, is not drawn to scale.

It will be appreciated that the characteristics of throat 27 can be adjusted by manipulation of member 28 and that the characteristics of throat 29 can be adjusted by replacement of a section with a corresponding section of somewhat different characteristics. Finally, the distance between throats 27 and 29 can be adjusted by replacement of section 26 with a corresponding section of somewhat different characteristics.

The partially liquefied feed enters high pressure stage 35 of a two-stage fractionating column 37 provided with the usual bubble trays. As is usual, a crude liquid oxygen product collects in the bottom of high pressure stage 35 and is withdrawn through conduit 39 and expanded almost to ambient atmospheric pressure in expansion valve 41 and is introduced at its appropriate composition level in low pressure stage 43 of column 37. Liquid nitrogen collecting on a shelf 45 in high pressure stage 35 is withdrawn through conduit 47 and expanded almost to ambient atmospheric pressure in expansion valve 49 and introduced as reflux liquid into the upper end of low pressure stage 43. Gaseous nitrogen at the top of low pressure stage 43 is withdrawn at −285° F. and 16.5 p.s.i.a. through conduit 51 and is divided, a portion equal to 58% of the initial feed passing through conduit 53 into the off-stream exchanger 7 in which it is warmed to a temperature of 95.8° F. and leaves at a pressure of 14.5 p.s.i.a. The other portion of waste nitrogen, that passes through nonreversing exchanger 17, is equal to 22% of the entering feed and leaves exchanger 17 through conduit 55 at a temperature of 35° F. and a pressure of 14.5 p.s.i.a. A valve 57 in either of conduits 53 and 55 controls the proportion of nitrogen that will pass through each of those conduits.

A liquid oxygen product of good purity collects at its saturation temperature in the bottom of low pressure stage 43 around condenser 59 and is withdrawn in liquid phase through conduit 61 and is equal to 20% of the entering feed. A portion of this liquid oxygen, equal to 5.15% of the entering feed, is withdrawn at low pressure through conduit 63, while the remainder, equal to 14.85% of the total feed, is withdrawn through conduit 65. A valve 67 in either one of conduits 63 and 65 controls the proportion of liquid oxygen in each of these conduits.

The portion of liquid oxygen in conduit 65 is pumped in pump 69 to a pressure of about 600 p.s.i.g. It enters heat exchanger 17 and is warmed and totally vaporized against incoming feed in conduit 23 and leaves exchanger 17 entirely in vapor phase at a temperature of 35° F. and a pressure of 600 p.s.i.g.

It is particularly to be noted that the pressure in conduit 9 is below the pressure of high pressure stage 35 of column 37, but that under the influence of a high pressure stream entering injector 25 through conduit 23, the low pressure stream in conduit 9 is raised to a pressure at least as high as the pressure of high pressure stage 35.

Figure 3:
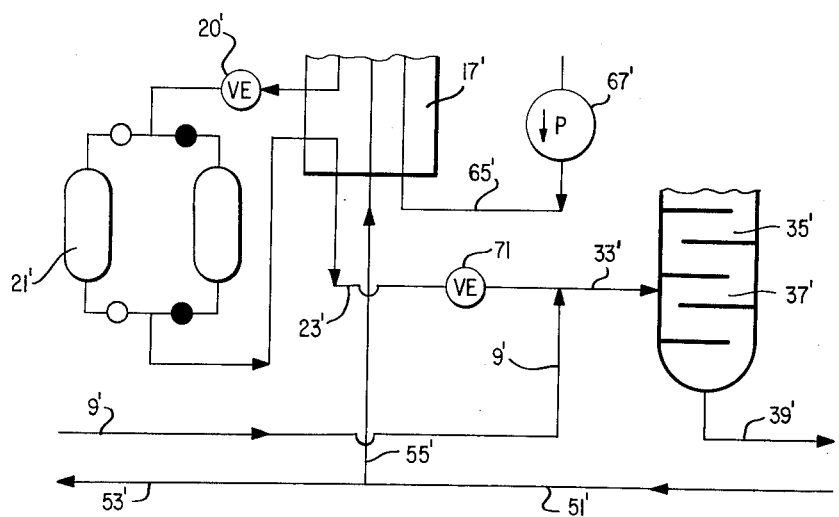
FIGURE 3 is a fragment of a view similar to FIGURE 1 but showing the most nearly comparable prior art arrangement.

FIGURE 3 illustrates a fragment of a corresponding cycle of the prior art. According to the teachings of the prior art, in place of injector 25, an expansion valve 71 is provided in conduit 23' downstream from exchanger 17'. If in this corresponding cycle according to the prior art the high pressure cooled air leaves exchanger 17' at −235° F. and 800 p.s.i.a., as in the cycle of FIGURE 1, just described, then it has to be expanded through valve 71 to 85 p.s.i.a. and −282° F., whereupon it is 65% in liquid phase, so that upon merger with the low pressure feed stream the resulting combined stream in conduit 33' has the same composition as in conduit 33 of FIGURE 1, that is, at −282° F. and 27.5% in liquid phase and at a pressure of 84.5 p.s.i.a. In order to achieve these conditions upon merger, however, the cooled low pressure air in conduit 9', at a temperature of −276° F. as in the example just described, has to be at a pressure of 87.2 p.s.i.a. This contrasts with a pressure of 76.1 p.s.i.a. in conduit 9 when the present invention is practiced.

The advantage of the present invention over known processes can best be recognized by comparing those two figures for the pressure of the cooled low pressure air stream: 76.1 p.s.i.a. according to the present invention as against 87.2 p.s.i.a. for the prior art. This means that in the prior art it was necessary to compress the low pressure stream to a pressure which is typically about 14.6% higher than in the present invention. The power savings of the present invention, expressed either in terms of refrigerative duty or electrical power consumption, are thus seen to be considerable.

From a consideration of the foregoing disclosure therefore, it will be clear that all aspects of the initially recited object of this invention have been achieved.

Although the present invention has been described, and illustrated in connection with a preferred embodiment, it is to be understood that modifications and variations may be resorted to without departing from the spirit of the invention, as those skilled in this art will readily understand. For example, a nonreversing heat exchanger could be substituted for reversing exchangers 7. In this case, adsorbers 21 would be omitted and a caustic scrubber and a dryer would be used downstream of compressor 3 and upstream of conduits 5 and 11. Moreover, the compressors indicated at 3 and 15 could take various forms and be in the form of plural compressors in parallel, or, particularly in the case of compressor 15, could be and preferably are multistage compressors. These and other modifications and variations of the present invention are considered to be within its purview and scope as defined by the appended claims.

What is claimed is:

1. Method of separating gaseous mixture in a low temperature operation employing a fractionating column operating under superatmospheric pressure from which cold component fluid of the gaseous mixture is withdrawn and employing an injector having a high pressure inlet, a low pressure inlet and an intermediate pressure outlet, comprising the steps of compressing a first portion of the gaseous mixture to a first pressure lower than the operating pressure of the fractionating column, passing the compressed first portion of the gaseous mixture in heat exchange relation with a first part of cold component fluid withdrawn from the fractionating column to cool the compressed first portion of the gaseous mixture, compressing a second portion of the gaseous mixture to a second pressure higher than the operating pressure of the fractionating column, passing the compressed second portion in heat exchange relation with a second part of cold component fluid withdrawn from the fractionating column to cool the compressed second portion of the gaseous mixture, the second part of cold component fluid including liquid component compressed to a relatively high pressure prior to heat exchange relation with the compressed second portion, passing the cool second portion of the gaseous mixture under a pressure greater than the operating pressure of the fractionating column to the high pressure inlet of the injector, passing the cool first portion of the gaseous mixture to the low pressure inlet of the injector, conducting fluid discharged from the outlet of the injector to the fractionating column, and operating the injector to maintain the pressure of the fluid discharge from the outlet thereof under a pressure at least equal to the operating pressure of the fractionating column.

2. Method of separating gaseous mixture as defined in claim 1 in which the first portion of the gaseous mixture is of a mass greater than the mass of the second portion of the gaseous mixture, and in which the pressure difference between the operating pressure of the fractionating column and the pressure of the second portion of the gaseous mixture fed to the inlet of the injector is substantially greater than the pressure difference between the operating pressure of the fractionating column and the pressure of the first portion of the gaseous mixture.

3. Method of separating air into component fluid including at least oxygen and nitrogen in a low temperature operation employing a multiple stage fractionating column having a high pressure fractionating zone operating under a predetermined pressure and a relatively low pressure fractionating zone from which cold component fluid of air is withdrawn, and employing an injector having a high pressure inlet, a low pressure inlet and an intermediate pressure outlet, comprising the steps of compressing a first portion of air to a first pressure lower than the operating pressure of the high pressure fractionating zone, passing the compressed first portion of air in heat exchange relation with a first part of cold component fluid withdrawn from the low pressure fractionating zone to cool the compressed first portion of air, compressing a second portion of air to a second pressure higher than the operating pressure of the high pressure fractionating zone, passing the compressed second portion of air in heat exchange relation with a second part of cold component fluid withdrawn from the low pressure fractionating zone to cool the compressed second portion of air, the second part of cold component fluid including liquid oxygen compressed to a relatively high pressure prior to heat exchange relation with the compressed second portion of air, passing the cool second portion of air under a pressure greater than the operating pressure of the high pressure fractionating zone to the high pressure inlet of the injector, passing the cool first portion of air to the low pressure inlet of the injector, conducting fluid discharge from the outlet of the injector to the high pressure fractionating zone, maintaining the mass of the first portion of air greater than the mass of the second portion of air, maintaining the pressure difference between the operating pressure of the high pressure fractionating zone and the pressure of the second portion of air fed to the inlet of the injector substantially greater than the pressure difference between the operating pressure of the high pressure fractionating zone and the pressure of the first portion of the air, and operating the injector to maintain the fluid discharged from the outlet thereof under a pressure at least equal to the operating pressure of the high pressure fractionating zone.

4. Apparatus for separating gaseous mixture into component fluid comprising a fractionating column operating under superatmospheric pressure wherein gaseous mixture is separated into cold component fluid, first compressor means for compressing a first portion of the gaseous mixture to a pressure less than the operating pressure of the fractionating column, first heat exchange means, first conduit means for conducting compressed first portion of the gaseous mixture and a first part of cold component fluid from the fractionating column to the first heat exchange means to cool compressed first portion of gaseous mixture, second compressor means for compressing a second portion of the gaseous mixture to a pressure greater than the operating pressure of the fractionating column, second heat exchange means, means for compressing cold component fluid in liquid phase withdrawn from the fractionating column, second conduit means for conducting to the second heat exchange means compressed second portion of the gaseous mixture and a second part of cold component fluid from the fractionating column including compressed cold component fluid in liquid phase to cool compressed second portion of gaseous mixture, an injector including a high pressure inlet, a low pressure inlet and an intermediate pressure outlet, third conduit means for conducting cool second portion of the gaseous mixture to the high pressure inlet of the injector, fourth conduit means for conducting cool first portion of the gaseous mixture to the low pressure inlet of the injector, fifth conduit means connecting the intermediate pressure outlet of the injector to the fractionating column, and means for maintaining the pressure of the fluid exiting from the intermediate pressure outlet of the injector at least equal to the operating pressure of the fractionating column.

References Cited by the Examiner

UNITED STATES PATENTS

| | | | |
|---|---|---|---|
| 2,712,738 | 7/1955 | Wucherer | 62—13XR |
| 2,754,666 | 7/1956 | Spitzer | 62—13 |
| 2,873,583 | 2/1959 | Potts | 62—43XR |

FOREIGN PATENTS 208,452 5/1957 Australia.

NORMAN YUDKOFF, *Primary Examiner.*